(No Model.)
E. BLASS.
APPARATUS FOR IMPREGNATING GASES WITH VAPORS OF VOLATILE SUBSTANCES.
No. 458,937. Patented Sept. 1, 1891.
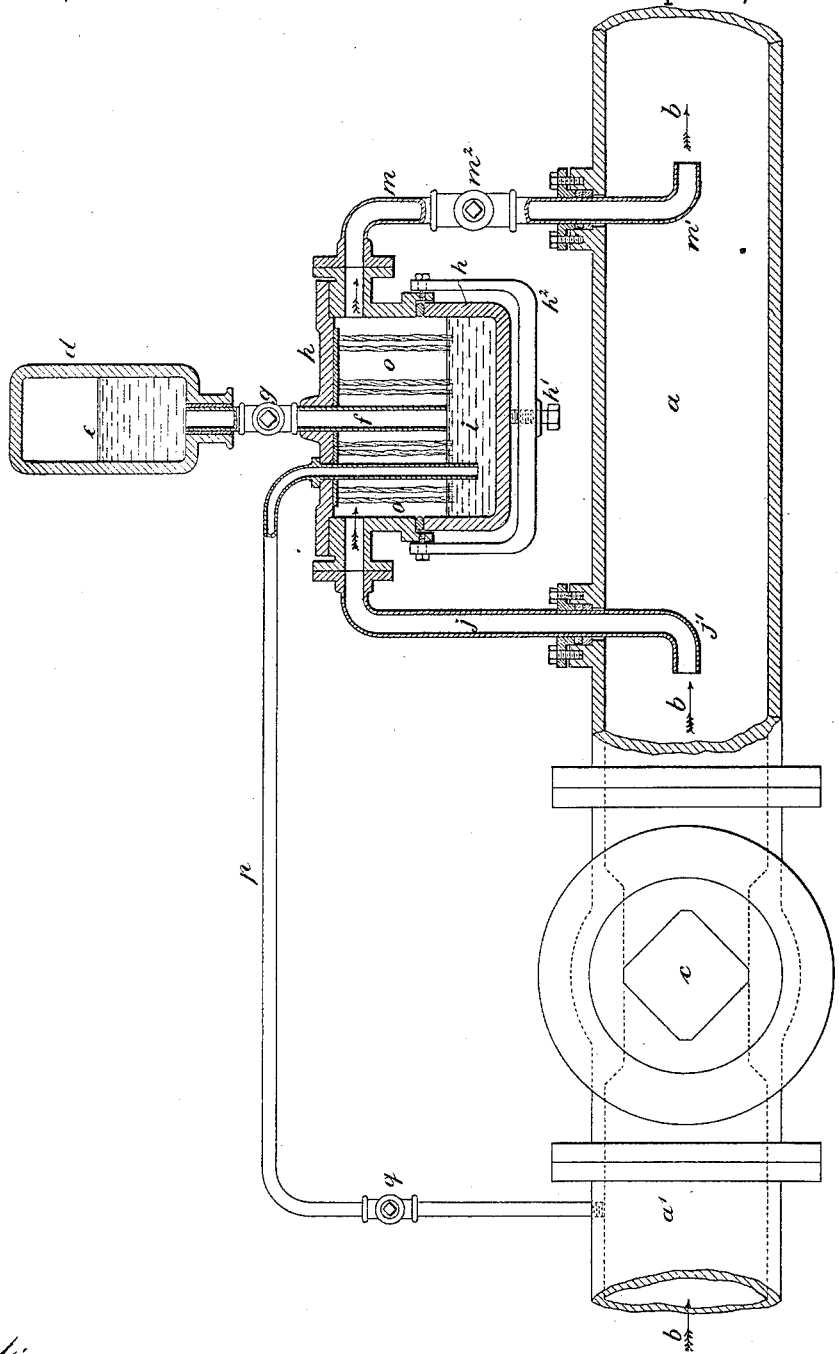
Attest:
Edward D. Knight.
Emma Arthur.
Edward Blass
by Knight Bros
Attys.

UNITED STATES PATENT OFFICE.

EDUARD BLASS, OF ESSEN-ON-THE-RUHR, GERMANY.

APPARATUS FOR IMPREGNATING GASES WITH VAPORS OF VOLATILE SUBSTANCES.

SPECIFICATION forming part of Letters Patent No. 458,937, dated September 1, 1891.

Application filed August 2, 1890. Serial No. 360,828. (No model.) Patented in France September 2, 1889, No. 200,526; in Belgium September 2, 1889, No. 87,603, and in England April 10, 1889, No. 6,130.

*To all whom it may concern:*

Be it known that I, EDUARD BLASS, a subject of the King of Prussia, residing at Essen-on-the-Ruhr, Kingdom of Prussia, Germany, have invented a new and useful Improvement in Apparatuses for Impregnating Gases with Vapors of Volatile Substances, (for which Letters Patent have been granted in France, September 2, 1889, No. 200,526; in Belgium, September 2, 1889, No. 87,603, and in Great Britain, April 10, 1889, No. 6,130,) whereof the following is a specification.

The object of my invention is to impregnate gases flowing through a conduit with vapors of volatile liquids in such manner that the quantity of vapor incorporated into the gas remains proportionately to the quantity of the latter approximately the same whether the speed of the gas-current in the conduit be high or low, and that the impregnation with vapors is practically suppressed when there is no flow of gas. For this purpose I combine with the gas-conduit a closed vessel adapted to hold the volatile liquid, and this vessel I put in communication with the conduit by means of two pipes connected to the former and reaching into the latter, the said pipes having inside of the conduit bends turned in opposite directions.

The invention is principally designed for impregnating water-gas (which is inodorous and extremely poisonous) with vapors of strongly-smelling liquids, such as mercaptan, in order that escapes of gas may readily be detected.

An apparatus carried out according to my invention is shown in the annexed drawing, partly in vertical section and partly in elevation.

$a'$ $a$ is the conduit or main through which gas flows in the direction of the arrows $b$. $c$ is a stop-cock inserted thereinto.

$h$ is the vessel containing the volatile liquid $i$, and which I shall term the "evaporator." To opposite sides of the said evaporator are connected above the surface of the liquid $i$ the two pipes $j$ and $m$, which extend down into the part $a$ of the main, the pipe $j$ having at its lower end a bend $j'$, so arranged that the open end of the pipe faces the current of gas passing along the main, while the pipe $m$ has a bend $m'$, turned in the opposite direction. Under these conditions a portion of the gas flowing along the main $a'$ $a$ will pass through the pipe $j$ into the evaporator to become impregnated with vapors, and it will thence pass out again through the pipe $m$ to return into the main gas-current and to mix therewith. The bends $j'$ and $m'$ of the pipes $j$ $m$ have the effect to insure uniform proportionality between the currents of gas in the main $a'$ $a$ and the current passing through the evaporator. Besides, as the generation of vapors in the later is proportionate, or approximately so, to the velocity with which the gas passes over the surface of the liquid, the gas will be impregnated in like degree, whichsoever may be its velocity in the main, whereas the evolution of vapors will nearly cease when the current in the main is stopped. For regulating the flow of gas through the evaporator the pipe $m$ is fitted with a cock $m^2$.

In view of keeping uniform the level of liquid in the evaporator a reservoir $d$, containing a supply of liquid, is combined therewith, the said reservoir communicating with the evaporator by means of a pipe $f$, extending down to the level of liquid to be maintained. The evaporator is preferably composed of an upper part made of metal and a lower part $h$, consisting in a vessel of glass, which is secured to the former by the stirrup $h^2$ and the screw $h'$. For increasing the evaporating-surface wicks $o$ may be suspended in the evaporator.

For the purpose of keeping up the impregnation of gas with vapor, if there should be any leakage from the part $a$ of the main when the cock $c$ is closed, a pipe $p$ is provided, which extends from the part $a'$ of the main to the evaporator, a small quantity of gas passing, under the said conditions, through the pipe $p$ into the evaporator and thence in impregnated state through pipes $j$ $m$ into the main $a$.

I claim as my invention—

The combination, with the gas-main $a$, of the evaporator $h$, containing a volatile liquid $i$, and the pipes $j$ and $m$, connected above the surface of the liquid to the vessel $h$ and extending into the gas-main $a$, the said pipes having the respective bends $j'$ and $m'$ turned in opposite directions within the main, substantially as specified.

In testimony whereof I have hereunto set my hand in the presence of two subscribing witnesses.

EDUARD BLASS.

Witnesses:
FRITZ MOELLENHOFF,
EMIL BUSCH.